(12) United States Patent
Nordman et al.

(10) Patent No.: US 8,600,844 B2
(45) Date of Patent: Dec. 3, 2013

(54) METHODS AND SYSTEMS FOR CUSTOMIZING INVENTORY IN AN AUTOMATED DISPENSING CABINET

(75) Inventors: Gary Nordman, North Vancouver (CA); Barney Ross, Surrey (CA); Marek Kloda, Newmarket (CA); Britt Walling, Sarnia (CA); Sean Grasby, Toronto (CA); Samuel Castano, Lake Bluff, IL (US)

(73) Assignee: W.W. Grainger, Inc., Lake Forest, IL (US)

( * ) Notice: Subject to any disclaimer, the term of this patent is extended or adjusted under 35 U.S.C. 154(b) by 0 days.

(21) Appl. No.: 13/365,047

(22) Filed: Feb. 2, 2012

(65) Prior Publication Data

US 2013/0204750 A1 Aug. 8, 2013

(51) Int. Cl.
*G06Q 10/00* (2012.01)

(52) U.S. Cl.
USPC ................................. 705/28; 705/7

(58) Field of Classification Search
USPC ........................................................ 705/28
See application file for complete search history.

(56) References Cited

U.S. PATENT DOCUMENTS

| | | | |
|---|---|---|---|
| 7,792,711 B2 * | 9/2010 | Swafford et al. | 705/28 |
| 7,894,936 B2 * | 2/2011 | Walker et al. | 700/238 |
| 7,988,049 B2 * | 8/2011 | Kuehnrich | 235/462.01 |
| 8,140,185 B2 * | 3/2012 | Simmons et al. | 700/241 |
| 2002/0107744 A1 | 8/2002 | Rosenberg et al. | |
| 2004/0056042 A1 | 3/2004 | Skavnak | |
| 2005/0004682 A1 * | 1/2005 | Gaddis et al. | 700/9 |
| 2006/0247823 A1 * | 11/2006 | Boucher | 700/241 |
| 2007/0100696 A1 * | 5/2007 | Illingworth | 705/14 |
| 2008/0103851 A1 * | 5/2008 | Walker et al. | 705/7 |
| 2009/0069930 A1 | 3/2009 | Peters et al. | |
| 2009/0306817 A1 * | 12/2009 | Antao et al. | 700/231 |
| 2009/0306820 A1 * | 12/2009 | Simmons et al. | 700/244 |
| 2010/0138037 A1 * | 6/2010 | Adelberg et al. | 700/241 |
| 2010/0268792 A1 | 10/2010 | Butler et al. | |
| 2011/0022980 A1 * | 1/2011 | Segal et al. | 715/810 |
| 2012/0004771 A1 * | 1/2012 | Walker et al. | 700/236 |

OTHER PUBLICATIONS

"VendMAX" www.streamware.com/products/vmax. Crane Software. Web. Sep. 28, 2011.*
Shelf Logic Software Products, Shelf Logic Master Edition Version 14.3, Jan. 2005, n.p.*
Shelf Logic Software Products, Shelf Logic Enterprise Edition Version 2, Jan. 2012, n.p., p. 85.*
Kasavana, Michael L, PhD, Product Recognition Software in Remote Distribution Networks, Journal of Global Business Management 7.2 (Aug. 2011): 1-8.*

* cited by examiner

*Primary Examiner* — Matthew Gart
*Assistant Examiner* — Ashford S Hayles
(74) *Attorney, Agent, or Firm* — Greenberg Traurig, LLP

(57) ABSTRACT

A system and method for configuring a dispensing cabinet with products within an electronic catalog hosted by a wholesaler system includes a display of a user interface having a graphical representation of a dispensing cabinet for dispensing products including a graphical representation of each dispensing mechanism. A selection of a single product from a listing of products associates the selected single product to at least one dispensing mechanism and causes a change in the graphical representation of the dispensing cabinet such that the at least one dispensing mechanism is visually identified as having the selected single product associated with the dispensing mechanism.

9 Claims, 16 Drawing Sheets

ACKLANDS GRAINGER | KeepStock
INDUSTRIAL·SAFETY·FASTENERS | INVENTORY MANAGEMENT franciase   Sign In

Welcome to the Acklands Grainger Cabinet Configurator

The Cabinet Configurator allows you to browse a selection of dispensable products and create a personalized configuration that meets your unique requirements. Using our virtual dispensing cabinet, your configuration could be ready in minutes, greatly reducing wait time and getting you much closer to receiving your cabinet.

Please sign in with your ID and Password. If you do not possess an active user ID to the Cabinet Configurator, please contact us using the form below. If you already have access to the Acklands Grainger website, you are still required to create a separate account for the Cabinet Configurator.

Sign In

User Name *  [_____] — 410

Password *  [**************] — 412

☐ Keep me signed in

[ Sign In ]

Request Access

* required fields

First Name *  [_____]        Last Name *  [_____]  ⎫
                                                              ⎬ 414
Email Address *  [_____]     Phone *  [_____]       ⎪

Company Name*  [_____]       Location *  [_____]   ⎭

[ Submit ]

Acklands-Grainger® Inc.  All rights reserved.

METHODS AND SYSTEMS FOR
CUSTOMIZING INVENTORY IN AN
AUTOMATED DISPENSING CABINET

FIELD OF THE DISCLOSURE

The present description relates generally to vending systems and more particularly to methods and systems for customizing inventory in an automated dispensing cabinet.

BACKGROUND OF RELATED ART

An automated dispensing cabinet, such as for example, an automated inventory vending machine is typically a controlled inventory storage device or cabinet that allows inventory to be securing stored and dispensed near a point-of-sale and/or point-of-use. The use of vending machines for providing various products, such as soft drinks or snacks, is well known. Typical vending machines provide for a plurality of receptacles (e.g., rows, trays or columns) for holding units of products, and a dispensing mechanism operable to dispense a product from each receptacle.

A vending machine typically holds a finite number of units of products and is refilled by an operator (e.g., a route driver) on a periodic or non-periodic basis. An operator typically loads a vending machine with a number of units of a variety of different products. For example, a first tray may be loaded with a plurality of units of a first product while a second tray may be loaded with a plurality of units of a second product. An operator typically determines how many units of each product to load based on past experience regarding demand for the products or simply by instinct as to what a user may like.

Configuration, optimization, and/or inventory control of a conventional dispensing machine has heretofore been an inexact science relying upon standard and/or stock configurations for applicability across many different dispensing customers. More particularly, to date there have been no known tools for allowing a customer and/or a service provider the ability to visually customize inventory in a dispensing cabinet while providing access to a catalog of products stored in a wholesale organizations data repository.

Therefore, it would, therefore be advantageous for a dispensing cabinet provider, manufacturer, and/or user to be able to customize and/or configure inventory in a dispensing machine for individual needs and/or preferences. Additionally, it would be advantageous to provide a system based tool able to access a large variety of products typically provided by a wholesaler during customization.

BRIEF DESCRIPTION OF THE DRAWINGS

FIG. 4 illustrates an example user interface such as an example webpage that provides login access to the example configuration system.

FIG. 16 illustrates an example submit window for use with the example configuration system.

DETAILED DESCRIPTION

The following description of example methods and apparatus is not intended to limit the scope of the description to the precise form or forms detailed herein. Instead the following description is intended to be illustrative so that others may follow its teachings.

In one example, the current disclosure generally describes a computer based inventory management tool, and more particularly to a configuration tool for choosing how to configure an automated dispensing machine. For instance, the examples described herein allow an end user to select products and/or inventory which is translated into an optimized configuration for the dispensing machine. In one example, the configuration tool allows an end-user and/or other suitable user, such as for example, a customer service representative, manufacturer, etc, the ability to build an inventory list and/or begin the development of a dispensing program (e.g., a configuration) for a specific customer's dispensing program. Additionally, the example configuration tool may give the user an assessment of how many machines they should be planning for based on the products, the inventory cycle, current usage and/or historic consumption data.

One example of the disclosed configuration tool allows a user to select a product, input the amount of the selected product, and illustrate an example product configuration in a virtual dispenser based upon the user inputs. For instance, in one example, a virtual machine may be displayed to show how many rows, slots, bins, doors, etc. will be filled by the entered material(s) (e.g., inventory, products, etc.) and display how full the virtual machine is with the currently entered materials. The present disclosure obtains information from a data repository about products that is specific to dispensing based on loading and configuring the dispensing machine. For instance, a request for a product sold in two packs of ten units will fill twenty coil slots, or two rows of ten coils. Additional examples and features will become evident with consideration of the following disclosure.

Figure 1:
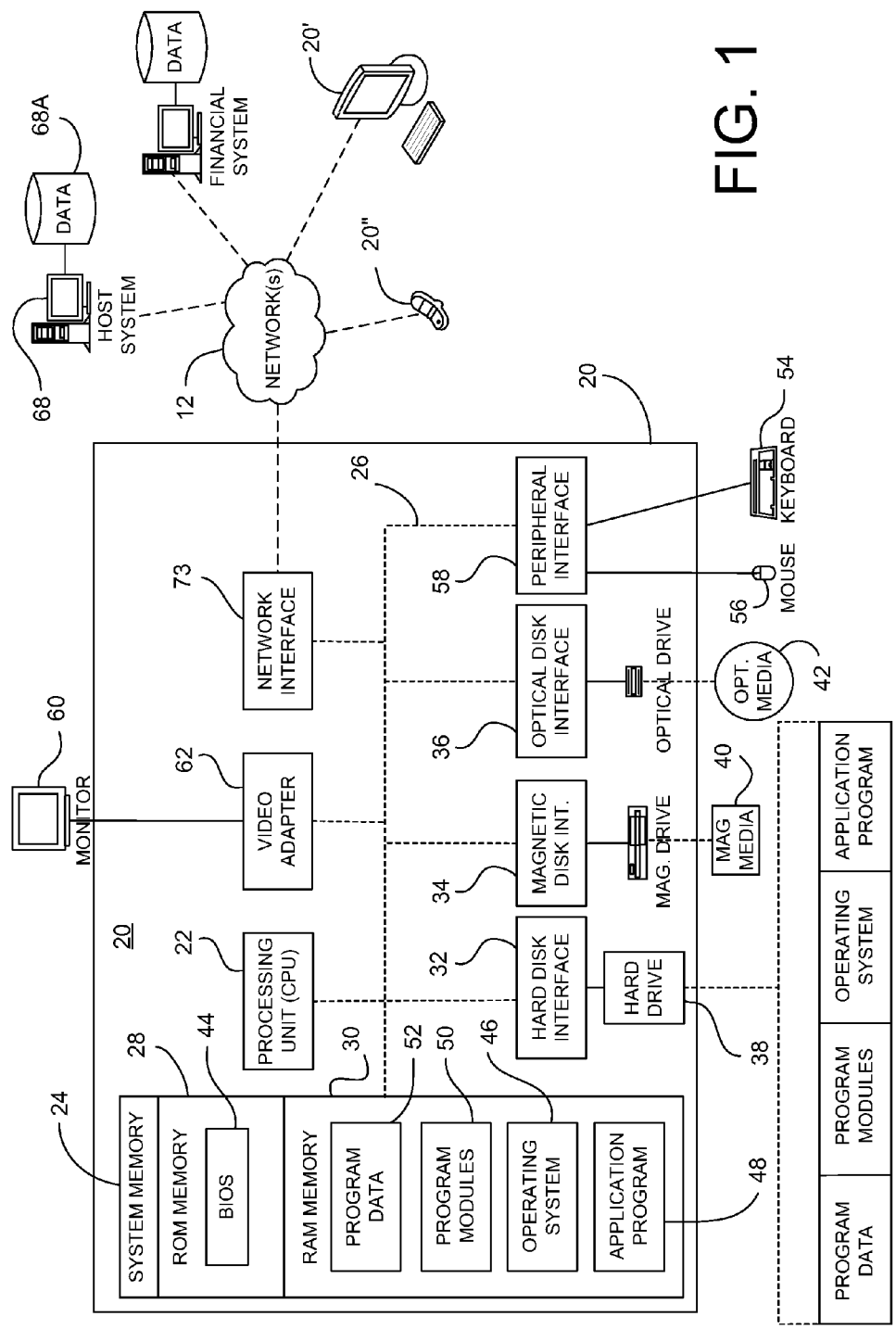
FIG. 1 is illustrates in block diagram form components of an example, computer network environment suitable for implementing the example configuration methods and systems disclosed.

With reference to the figures, the following discloses various example systems and methods for customizing inventory in an automated dispensing cabinet. To this end, FIG. 1 illustrates a processing device 20", illustrated in the exemplary form of a mobile communication device, a processing device 20', illustrated in the exemplary form of a computer system, and a processing device 20 illustrated in schematic form, such as for example, a home computer, each of which may be provided with executable instructions to, for example, provide a means for a customer, e.g., an end user, representative, consumer, etc., to interact with the device 20 and/or to access a host system server 68. Generally, the computer executable instructions reside in program modules which may include routines, programs, objects, components, data structures, etc. that perform particular tasks or implement particular abstract data types. Accordingly, those of ordinary skill in the art will appreciate that the processing devices 20, 20', 20" illustrated in FIG. 1 may be embodied in any device having the ability to execute instructions such as, by way of example, an appliance, a personal computer, mainframe computer, a mobile device, a personal-digital assistant ("PDA"), cellular telephone, tablet computer, ereader, or the like. Furthermore, while described and illustrated in the context of a single processing device 20, 20', 20" those of ordinary skill in the art will also appreciate that the various tasks described hereinafter may be practiced in a distributed environment having multiple processing devices linked via a local and/or wide-area network whereby the executable instructions may be associated with and/or executed by one or more of multiple processing devices.

For performing the various tasks in accordance with the executable instructions, the example processing device 20 includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer readable instructions, data structures, program modules and other data for the processing device 20. Those of ordinary skill in the art will further appreciate that other types of non-transitory computer-readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example via a network connection.

To allow a user to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, motion sensor, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as, for example, speakers, cameras, printers, or other suitable device.

As noted, the processing device 20 may also utilize logical connections to one or more remote processing devices, such as the host system server 68 having associated data repository 68A. In this example, the server 68 may act as a wholesaler system as described herein. In this regard, while the host system server 68 has been illustrated in the exemplary form of a computer, it will be appreciated that the host system server 68 may, like processing device 20, be any type of device having processing capabilities. Again, it will be appreciated that the host system server 68 need not be implemented as a single device but may be implemented in a manner such that the tasks performed by the host system server 68 are distributed amongst a plurality of processing devices/databases located at different geographical locations and linked through a communication network. Additionally, the host system server 68 may have logical connections to other third party systems via a network 12, such as, for example, the Internet, LAN, MAN, WAN, cellular network, cloud network, enterprise network, virtual private network, wired and/or wireless network, or other suitable network, and via such connections, will be associated with data repositories that are associated with such other third party systems. Such third party systems may include, without limitation, systems of banking, credit, or other financial institutions, systems of third party providers of goods and/or services (e.g., inventory), systems of shipping/delivery companies, etc.

For performing tasks as needed, the host system server 68 may include many or all of the elements described above relative to the processing device 20. In addition, the host system server 68 would generally include executable instructions for, among other things, querying the data repository 68A, storing and/or retrieving a particular configuration, providing for display on a client computing device a webpage in conjunction with the teachings of the present disclosure, receiving information regarding at least one dispenser configuration, and providing a configuration service to coordinate the arrangement of the dispensing machine.

Communications between the processing device 20 and the host system server 68 may be exchanged via a further processing device, such as a network router (not shown), that is responsible for network routing. Communications with the network router may be performed via a network interface component 73. Thus, within such a networked environment, e.g., the Internet, World Wide Web, LAN, cloud, or other like type of wired or wireless network, it will be appreciated that program modules depicted relative to the processing device 20, or portions thereof, may be stored in the non-transitory memory storage device(s) of the host system server 68.

Figure 2:
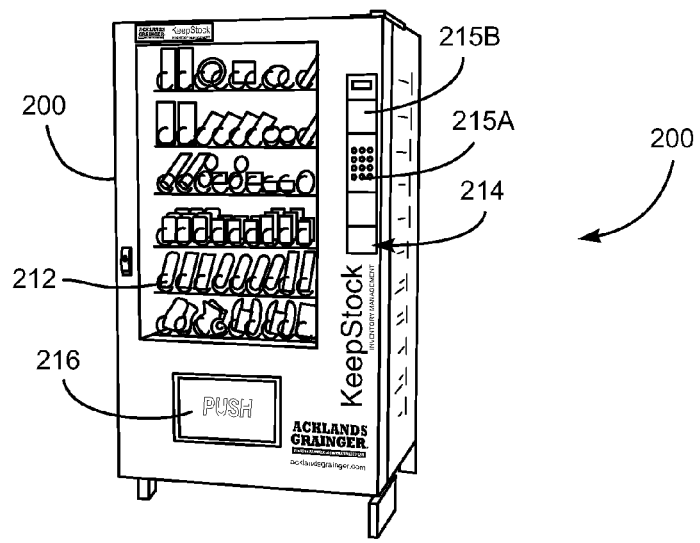
FIG. 2 is a perspective view of an example dispensing machine which may be configured with an example configuration system of the present disclosure.

Referring now to FIG. 2, an example dispensing machine 200 is illustrated. The example machine 200 may be any type of suitable dispensing machine including, for instance a carousel, coil, door, or any other suitable design and/or combination of designs. For instance, the example dispensing machine 200 is a point-of-use located secured dispenser including a housing 210 and means for delivering goods such as a plurality of dispensing mechanisms 212. The dispensing machine 200 also typically includes a delivery controller 214 for controlling the delivery of items such as tools. The example delivery controller 214 also includes a user interface for entering data include data input devices 215A and a display 215B. The user interface is typically coupled to a processor (not shown) to permit a user to enter indicia, such as alphanumeric and other symbols, to select individual items to be dispensed.

In the illustrated example, the dispensing mechanisms 212 are helical coil delivery devices, although various other means for delivering may be utilized including a carousel, drawer, door, robotic delivery, other suitable device, or any combination thereof. While the present disclosure oftentimes discusses the configuration of a coil, it will be appreciated that the principles of configuration apply equally to all potential cabinet types and dispensing mechanisms. As will be understood by one of ordinary skill in the art, a typical helical coil delivery device may include helical coils or helixes which are rotated by motors (not shown) to deliver tools or other related supplies to a point of delivery, such as for example, a deliver aperture 214.

Each helix may be driven and/or otherwise controlled by a single motor or alternatively, a plurality of helixes could be interconnected for operation by a single motor to deliver an item. As is typical with dispensing cabinets, in this example, rotation of the helixes repositions the items nested therein including, for instance, the item which is dispensed by the rotation. As will be appreciated, the location, size, and/or construction of the delivery means may vary as desired. For instance, in one example a plurality of helixes may be disposed side by side and the separation between the helixes can be varied by removing intermediate ones thereby adjusting the helixes to receive items of different sizes. Similarly, one, two or more helixes may be devoted to individual items. Because the dispensing machine 200 may be constructed with a wide variety of sizes, shapes, etc, and because the delivery methods may include many different means, sizes, and configurations, the present disclosure provides for systems and methods for configuring any dispensing machine.

Figure 3:
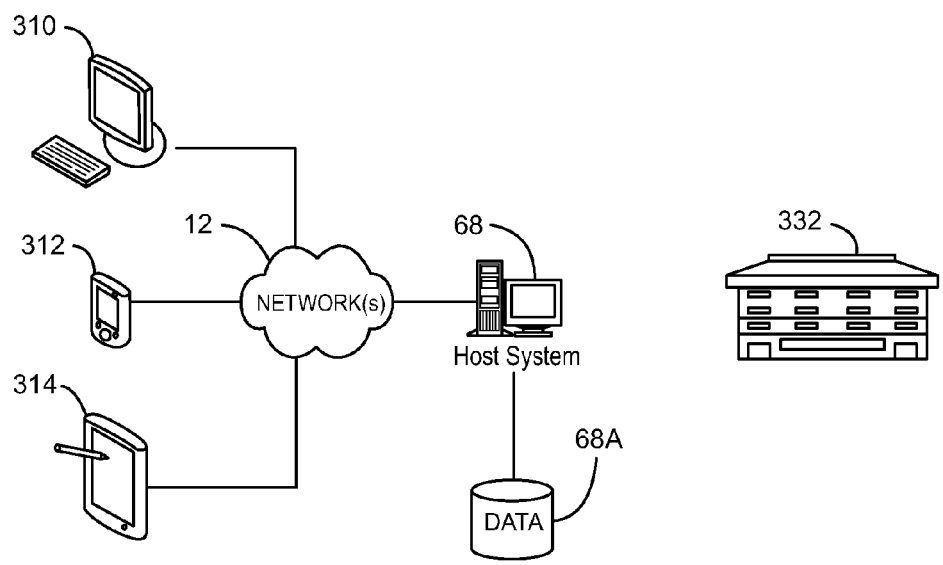
FIG. 3, illustrates a block diagram of one example configuration system in which a user may customize and/or configure the inventory of a dispensing machine.

Referring to FIG. 3, there is illustrated an example dispensing machine configuration system 300. As illustrated, in the example system 300, a user, which may be an end-user, a customer representative, a manufacturer, an account manager, etc., initiates a dispensing machine configuration through any suitable device, such as a computer 310, a mobile device 312, a tablet computer 314, or any other suitable known or yet to be developed device. In the disclosed example, the device may be, for instance, one of the devices 20, 20', 20", but it will be appreciated by one of ordinary skill in the art that the device may be any suitable device including any image, voice, and/or text device.

As the configuration system 300 is utilized, the system 300 includes electronic access to the host system server 68 through, for example, the network 12. While the server 68 is illustrated as being remotely located from the devices 310, 312, 314, it will be understood that the server 68 may be partially and/or wholly provided local to the device and may be accessible with or without requiring the network 12. As noted above, the server 68 may provide the system 300 with access to the associated data repository 68A, which in this example is a repository of item inventory including at least one of size, quantity, shape, weight, or other suitable characteristics. The system 300 may utilize the data to configure a dispensing cabinet as detailed below. Once the cabinet is configured, the system 300 may provide the configuration data to a manufacturer or other supplier 332 to construct and/or configure the dispensing cabinet as desired. In some instances, the cabinet configuration includes a standard configuration, while in other instances, the cabinet configuration requires at least some customization, thereby requiring a cabinet build. Additionally, the system 300 may provide notification alerts to at least one of the user or the supplier 332 to inform notification. The example system 300 may enable interactive data communications amongst users, customer service agents, customers, service associates, and/or partners, etc, across varied platforms, (e.g., iOS, Android, Windows, etc.), devices (e.g., Mobile phones, PCs, Macs, Tablets, etc), networks (e.g., Wi-Fi, 3G, 4G, etc.), and media (e.g., voice, text, video, etc).

Turning to FIGS. 4-16 there are illustrated various example user interfaces including user interface elements for configuring inventory associated with a dispensing device in accordance with the teachings of the present disclosure. For instance, FIG. 4 illustrates an example user interface 400 to provide secure access to the system 300 by allowing a user to sign-in and/or otherwise be authorized to use the system 300. The example user interface 400 includes the ability to provide a customer user name 410 (e.g., an email address) and a password 412 that is associated with the user account. The example interface 400 also allows a non-authorized user to request access to the system 300 by providing an access request interface 414. To request user access, the system 300 may generate an email or other suitable notification to a system operator, such as an account manager, system operators, or other suitable entity.

Figure 5:
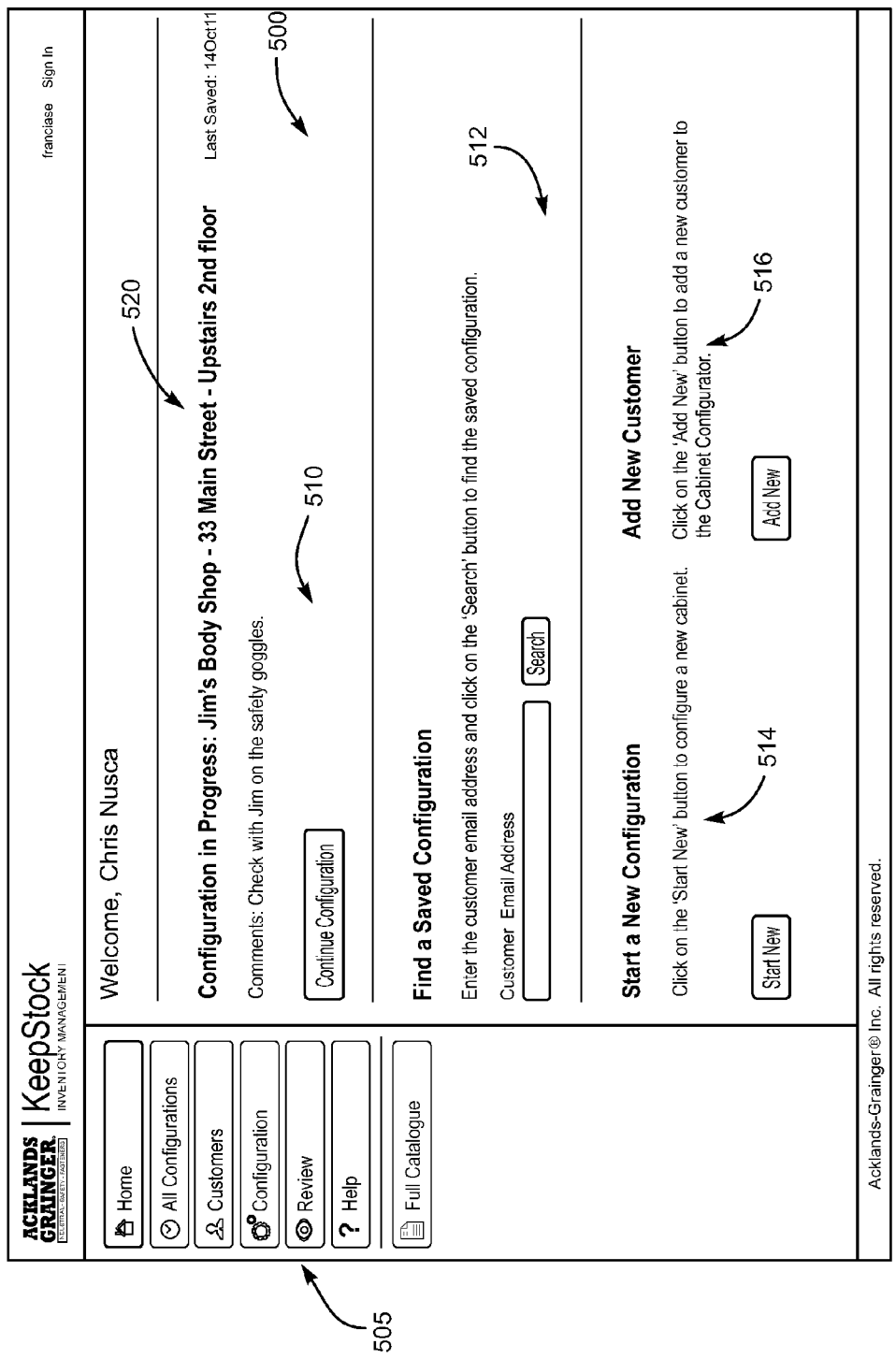
FIG. 5 illustrates an example webpage that provide navigational access to the example configuration system.

Once the user is logged into, or otherwise authorized to use the system 300, a user interface such as a welcome page or home page 500 may be displayed to the user such as shown in FIG. 5. The system 300 may also provide a common (e.g., persistent) navigation bar 505 to allow the user to quickly navigate through the various pages as will be described herein. In the illustrated example, the example home page 500 provides the user with an interface 510 displaying any configurations that are in progress, a user interface 512 that provides the ability to search for a saved configuration, a user interface 514 that allows a user the ability to start a new configuration, and a user interface 516 that, if authorized, provides the user the ability to add and configure a new authorized user of the system.

In providing the example home page 500 the system 300 will retrieve user data from the server 68 and display any in-progress configurations saved on the system at 510. In this context, the in-progress configuration means that the user has already started building a cabinet but did not finish and therefore, the partial configuration may be saved in the data repository 68A. The saved configurations may include identifying text 520 to assist the user in finding the proper partial configuration.

As noted, the example home page 500 may include the ability to search for a saved configuration at the interface 512. In this instance, the search function includes a search capability on a user account name (e.g., a user email address) but it will be appreciated that the search capability may be on any field and/or attribute as is known in the art. Additionally, the home page 500 may present the user with the ability to start a new configuration of a new cabinet. The new configuration may be started from scratch (e.g., a completely new design), may be developed from a template and/or old design, may be a copy of a standard and/or previously customized build, may be suggested by the system 300 based upon typical configurations, etc.

Figure 6:
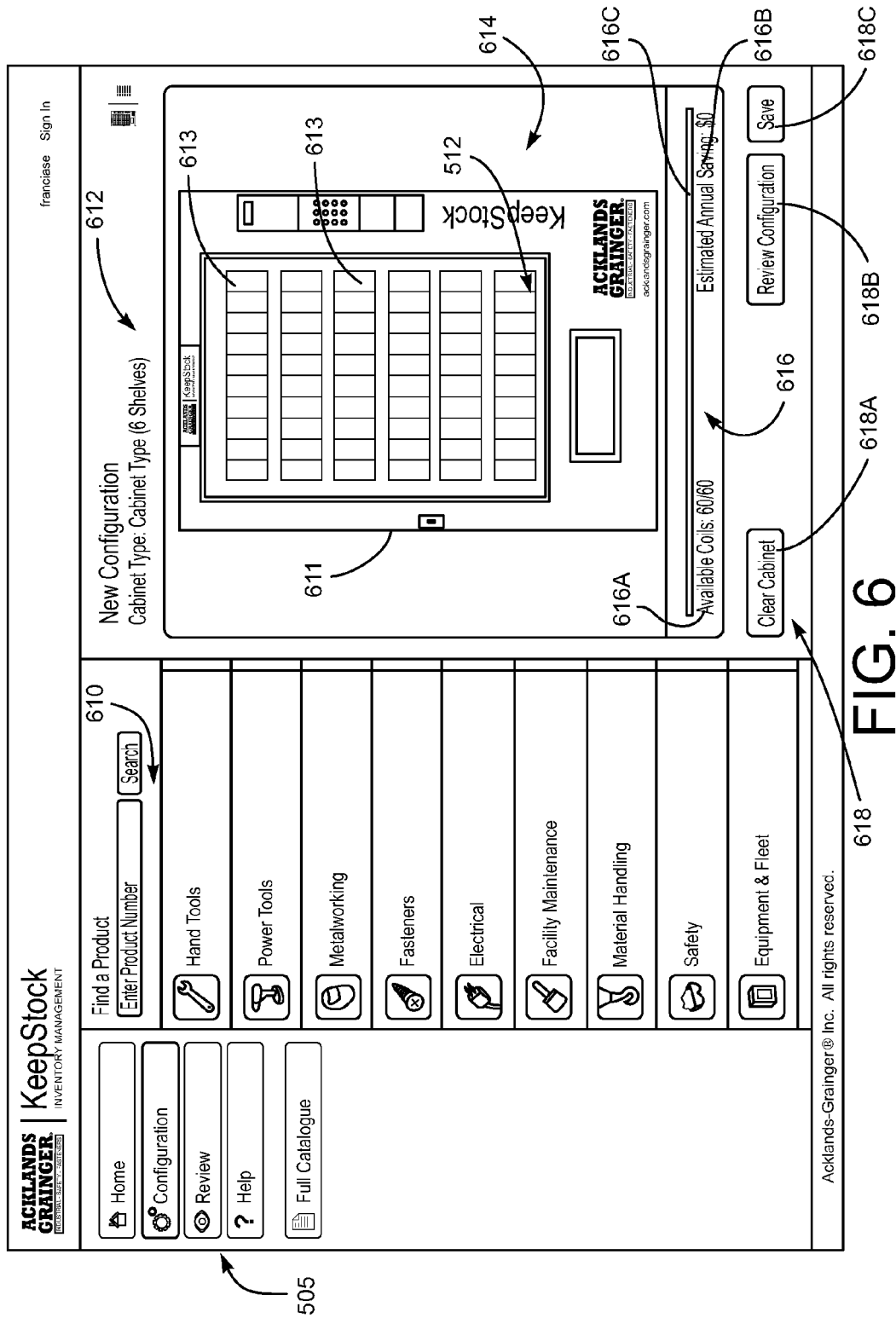
FIG. 6 illustrates an example webpage that provides current configuration information for the example configuration system.

Once the configuration process has begun, the user is presented with a configuration page 600, an example of which is illustrated in FIG. 6. It will be understood that the configuration page 600 may also be navigated to by any suitable navigational means including through the use of the navigation bar 505. In the example configuration page 600, a user may be presented with a user interface 610 to provide the user with the ability to search for and/or browse a local and/or remote catalog (sorted or unsorted) for a product, a user interface 612 to select a cabinet type, a user interface 614 displaying a graphical representation of a dispensing cabinet including a current cabinet configuration 611 (including a graphical representation of each individual coil 613, tray, door, etc), a status bar 616 displaying information regarding the current build, and various selectable buttons 618 for navigating within the configuration file.

For example, in the illustrated configuration page 600, the user may select a cabinet type (e.g., coil, carousel, door, etc) and size and/or configuration through the interface 612. The selected cabinet type may then be illustrated in the interface 614 to visually assist the user in configuring the cabinet. In this example, the cabinet type is retrieved from the data repository 68A, although any suitable data retrieval and/or data repository may be used. Additionally, in at least some examples, the cabinet type may be customized and/or otherwise provided to the user to suit the user needs if desired. Still further, once the cabinet has been selected and the configuration of the cabinet has begun (e.g., at least one product has been place in the cabinet configuration), the interface 612 may be protected such that the cabinet type cannot be changed and/or otherwise altered without first prompting and/or confirming with the user that the current configuration should be saved or otherwise discarded.

Once the cabinet type is selected and displayed to the user in the interface 614, the status bar 616 may be updated to reflect specific information regarding the current build. For instance, in the illustrated example, the status bar 616 is updated to include a real-time display of the number of available coils filled and/or remaining (616A), as well as an estimated annual savings (616B), which may show an estimated annual savings/discount if the customer were to utilize the cabinet for a specified period, such as 52-week period. In the example status bar 616, the available coils 616A also includes an indicator bar 616C that will fill with a selected highlight to show the progress towards complete filing of the remaining coils. Of course, it will be appreciated by one of ordinary skill in the art that the status bar 616 may include additional and/or alternative information related to the status of the build configuration without departing from the teachings of the present disclosure.

The estimated savings (616B) may be calculated through any desired calculation criteria. In this example, the annual savings may include an estimation based upon the usage of the item, less the estimated loss of the item, plus the estimated return based upon restricted access. The estimated savings data may be updated and/or modified with additional data and/or assumptions at anytime to provide the most relevant data to the user.

With regard to the selectable button 618, it will be appreciated that the type and/or number of buttons may vary as desired. In this example, however, the buttons 618 include a "Clear Cabinet" button 618A, a "Review Configuration" button 618B, and a "Save" button 618C. When selected, the example "Clear Cabinet" button 618A allows a user an easy way to clear the contents of the configuration window and to start over. Because selection of the button 618A could potentially result in a lot of work being discarded, in this example selection of the button 618A will result in a confirmation message (e.g. a pop-up warning message) being shown to the user for confirmation that they wish to continue with discarding the current configuration. When the example "Review Configuration" button 618B is selected, the current supply list and/or information associated with the current configuration will be displayed to the user. As will be appreciated, reviewing the configuration in this manner will allow the user to confirm the contents of the cabinet and to verify that the order looks like intended. Finally, the "Save" button 618C, when selected, will allow the user to save the current configuration "as-is" for retrieval at a later time. It will be appreciated that there may be other selectable buttons 618 present as desired. For example, in one example, the configuration page 600 may provide an "Assign" selectable button (not shown) that may allow a user, assuming they have the proper authorization, to create a configuration for another user, and assign the configuration to that user.

Figure 7:
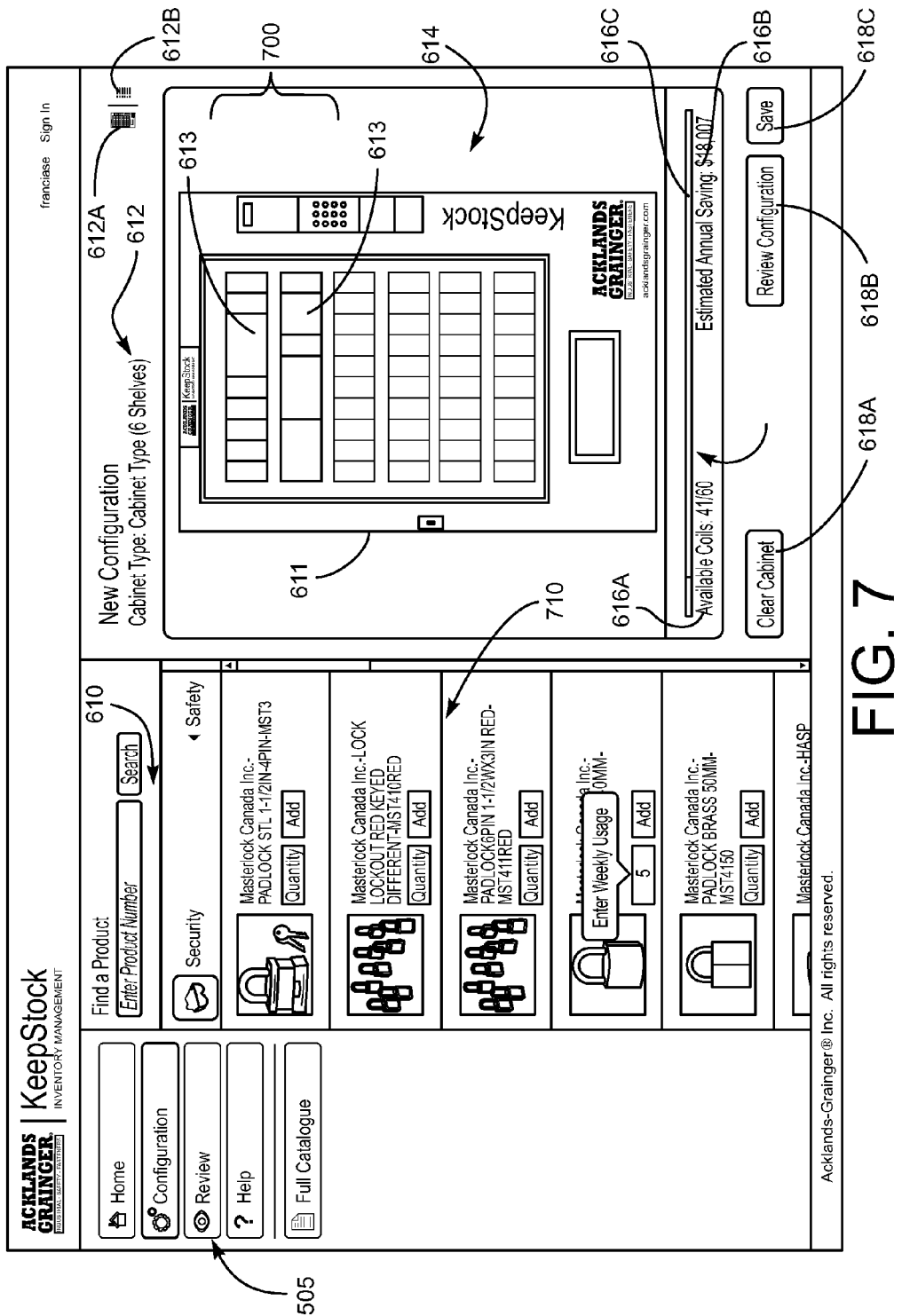
FIG. 7 illustrates an example webpage that provides the ability to add a product or inventory utilizing the example configuration system.

Turning now to FIG. 7, there is illustrated an example of the configuration page 600 after the user has selected a few inventory items for inclusion in the cabinet. In this illustrated example, the user has already added products in an upper area 700 of the cabinet. As can be seen, upon adding products in the configuration, the graphical representation of each individual coil 613 currently configured will change (e.g., color, size, and/or other attribute) to graphically illustrate that the coil 613 is already configured. As shown, the example coil 613 is visually changed such that the color of the graphical representation of the coil 613 matches the predefined color of the category of the product already placed in the coil 613. In addition, the graphical representation of the coil 613 may be modified to illustrate that the product chosen may be sized such that the product takes up two, three, four, etc. coils. Additionally, the available coils 616A, the estimated annual savings 616B, and the status bar 616C, are updated to reflect the current status of the present configuration.

Additionally, as illustrated, in the example of FIG. 7, the user has selected a category of products (e.g., "Security") from the user interface 610. In this instance, the user interface 610 displays a product browser 710 that includes a listing of products in the selected category. For example, the "Security" category includes a listing of various items logically related to a security category, such as, for instance, pad locks. In this example, the product browser includes a picture of the item, a brief description and/or title, a product number, an input field including a desired quantity (e.g., a weekly usage), and an "Add" button. When the user selects the "Add" button, the inputted number of the selected product will be added to the cabinet configuration. It will be appreciated that the information and/or sorting of products in the product browser 710 may be customized as desired. Still further, it will be appreciated that the interface 710 may allow a user to add a product through any suitable input means including a drag-drop operation as desired.

The selected product may be added to the cabinet configuration in any number of configuration methods. For example, when sizing data is available, the product may be placed in the first coil(s) that can accommodate the sized product. Alternatively, when sizing data is unavailable, a placeholder may be placed in the first available coil and a message indicating a possible custom build may be displayed. Placement of the products in the coils may also be determined by a predefined rule set and/or may be customized by the user as desired. For example, the system 300 may locate heavier items lower in the cabinet to avoid potential safety issues, and/or may group/regroup the products in the coils by product group, genre, characteristics, predicted usage statistics, historical usage statistics, etc.

Figure 8:
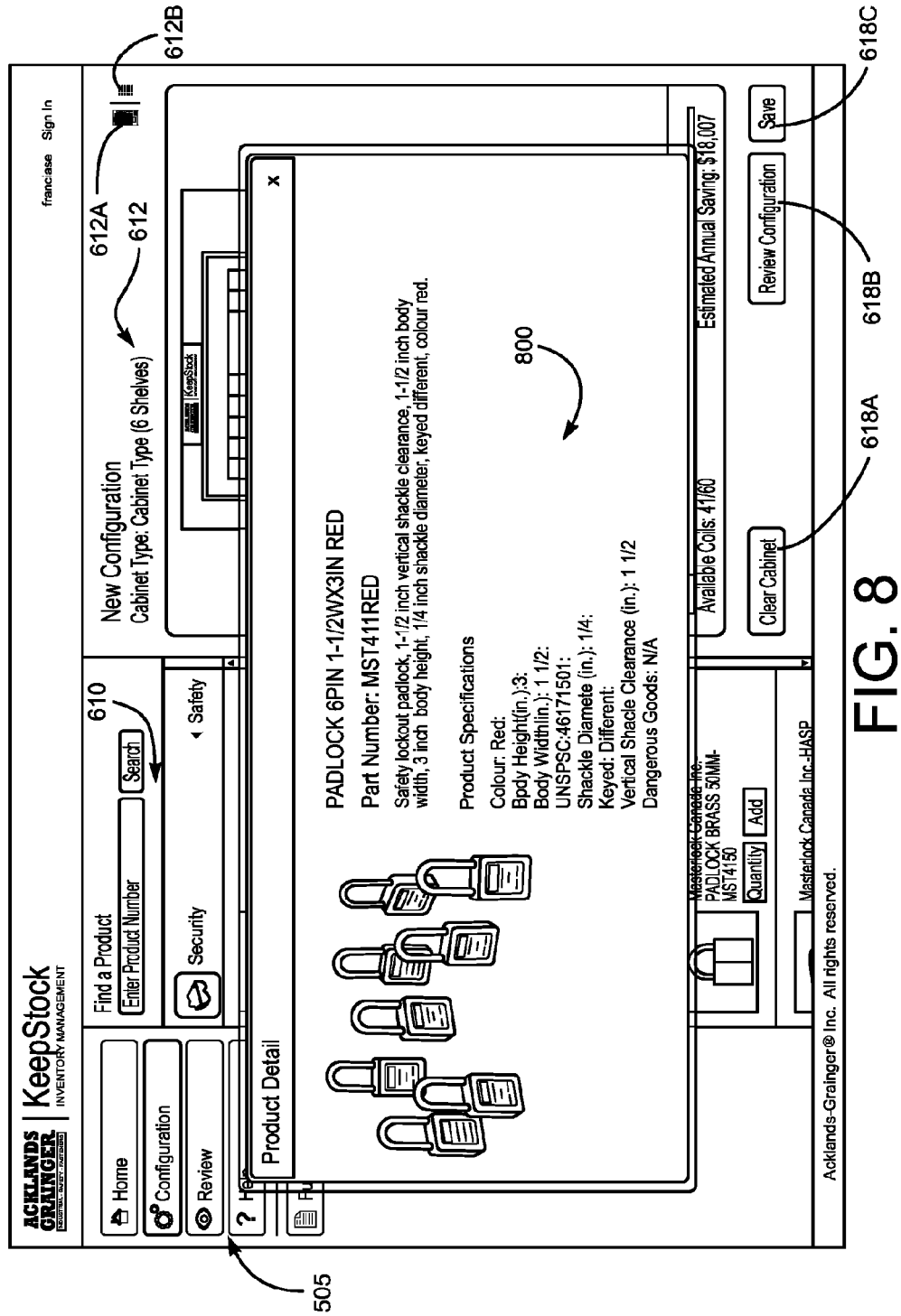
FIG. 8 illustrates an example popup window that provides product detail for a product utilizing in the example configuration system.

As illustrated in FIG. 8, selecting a product in the product browser 710 may provide the user with a product detail interface 800. In this example, the product detail interface 800 is a "pop-up" window, but in other examples, the interface 800 may be any suitable interface display. As shown, the product detail interface may include any desired information relevant to the product, such as for example, a title, description, part number, and/or product specifications.

Figure 9:
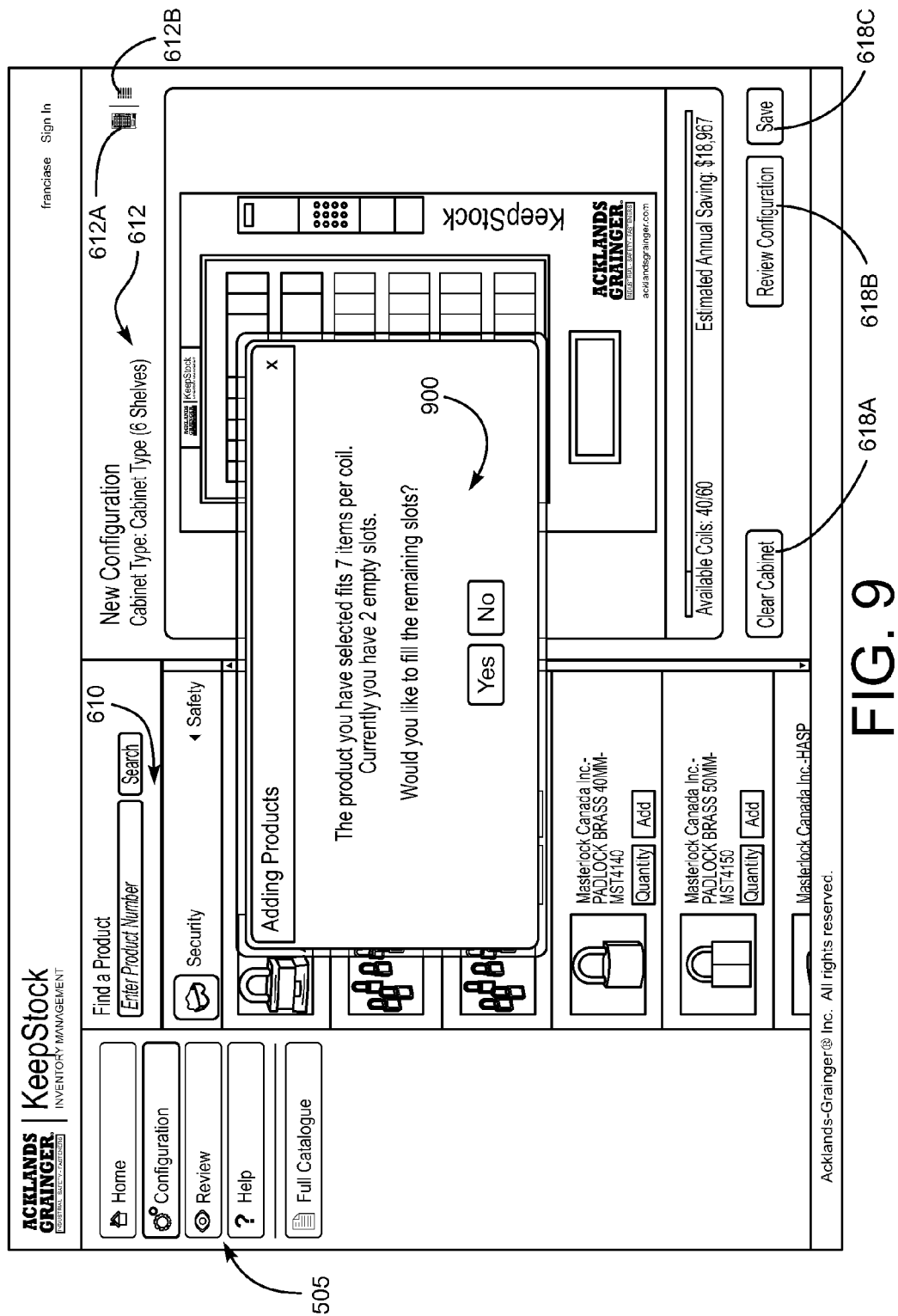
FIG. 9 illustrates an example confirmation message for adding a product in the example configuration system.

Referring to FIG. 9, an illustration of an example user interface 900 for providing a user with inventory suggestions is shown. In this example, when the user is adding product to the cabinet (e.g., with the "Add" button in product browser 710), if the amount selected does not completely fill the coil (or other container), the system may suggest a "top up" by adding additional units to the coil in order to completely fill the coil. If presented, the interface 900 may provide the user the option of accepting or declining the suggestion for additional quantity as desired. For instance, in the illustrated example interface 900, the user has selected a product that fits seven items per coil, but the chosen quantity leaves two empty slots. Thus, the example interface 900 presents the user with the option of accepting the additional product to fill the coil, or to decline the suggestion and keep the configuration as is.

Figure 10:
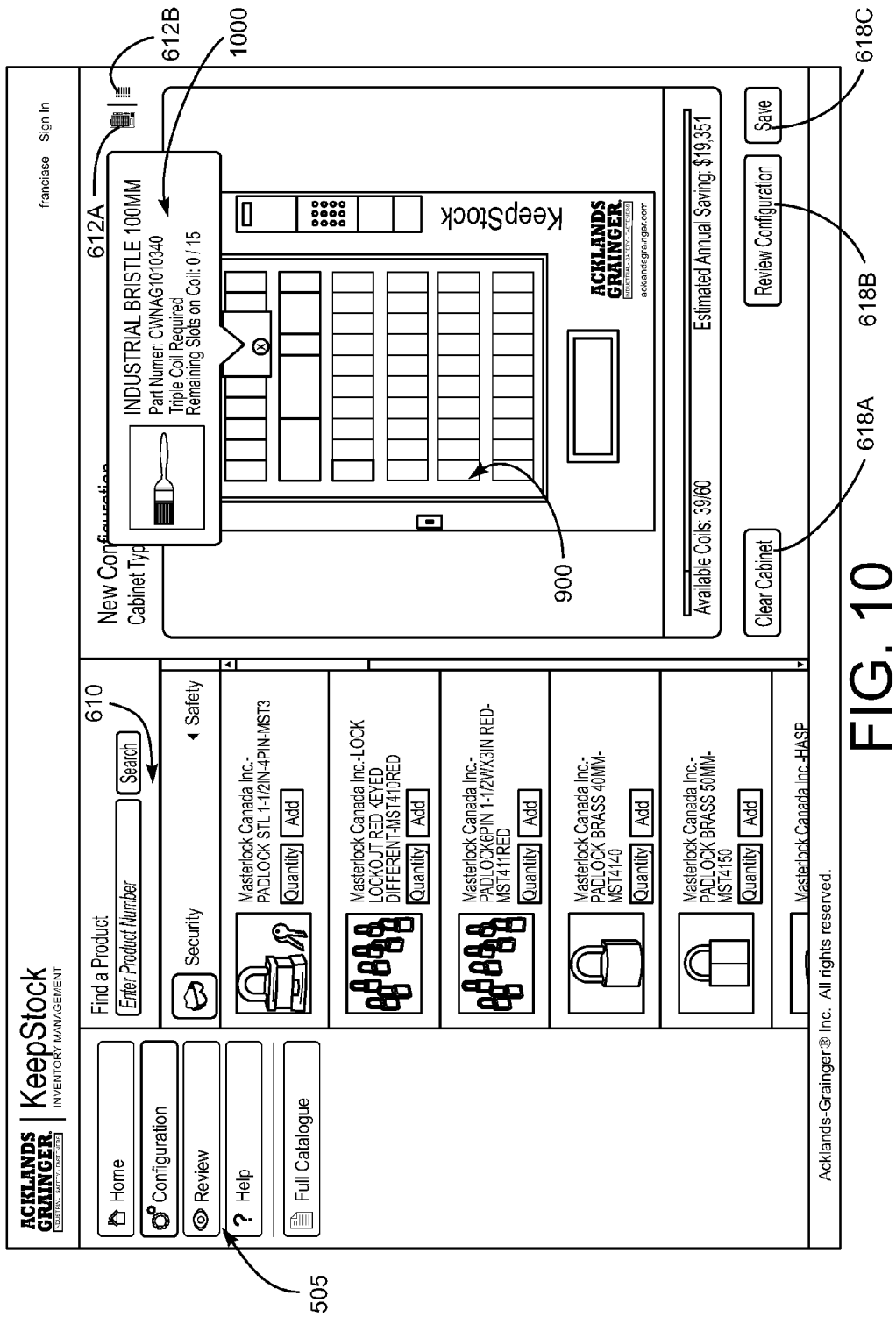
FIG. 10 illustrates an example popup window that provides product detail for a product associated with a dispensing mechanism in the example configuration system.

An additional feature of the example configuration page 600 is the ability to "hover" over a graphical representation of each individual coil 613 to reveal details of the product assigned to the chosen coil as shown in FIG. 10. In the illustrated example, the user may select and/or otherwise identify (e.g., by "hovering", mouse-over, etc.) the desired coil 613, and activate a product detail interface 1000 that provides the user with relevant information regarding the configured coil. In the illustrated interface 1000, the user is presented with information regarding the product, the number of coils required, and the remaining slots in the coil as configured. Additionally, the interface 1000 may present the user with the ability to remove, detail, and/or otherwise edit the configuration as desired.

Figure 11:
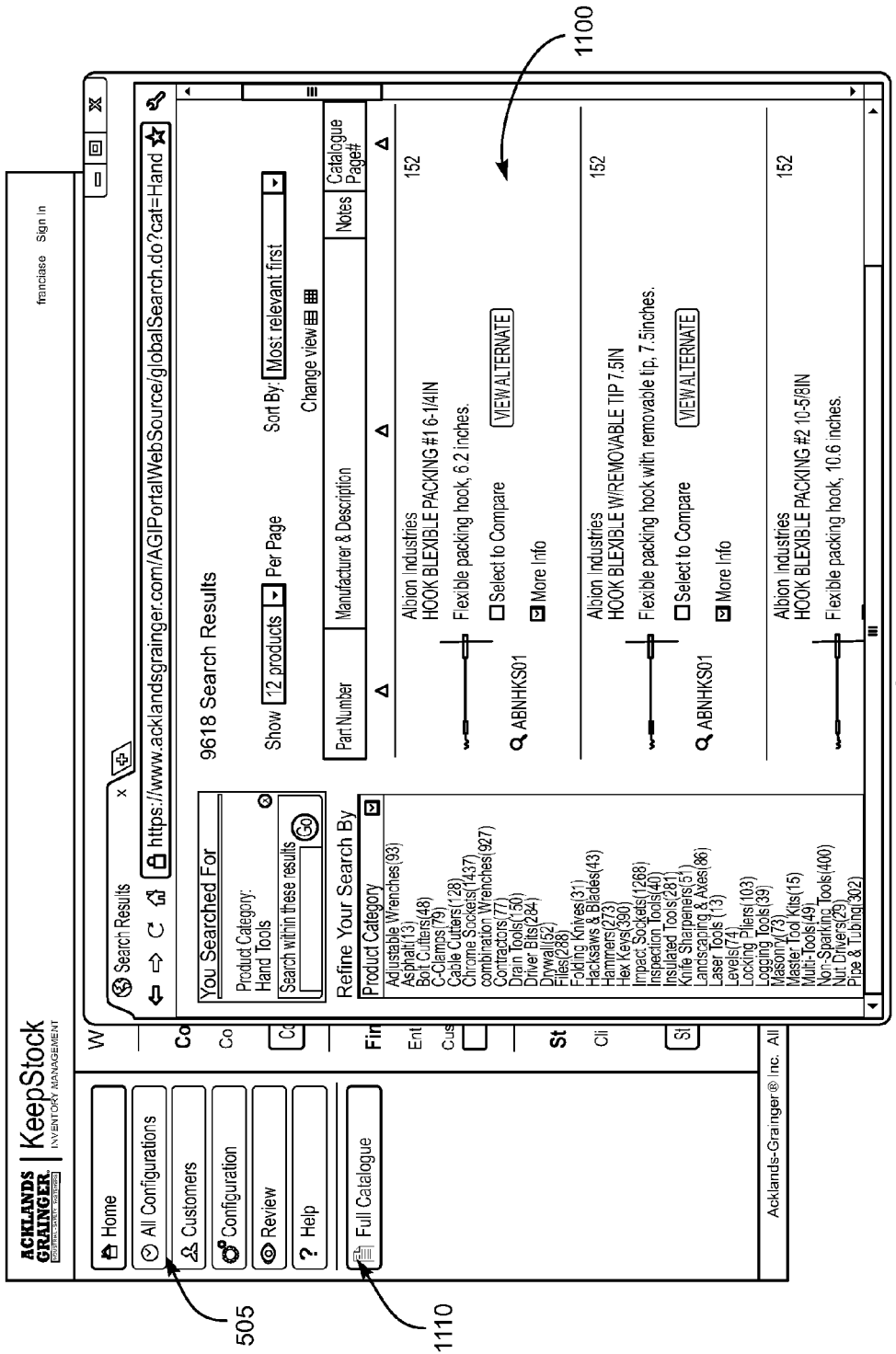
FIG. 11 illustrates an example window providing access to a data repository of products for use in conjunction with the example configuration system.
Figure 12:
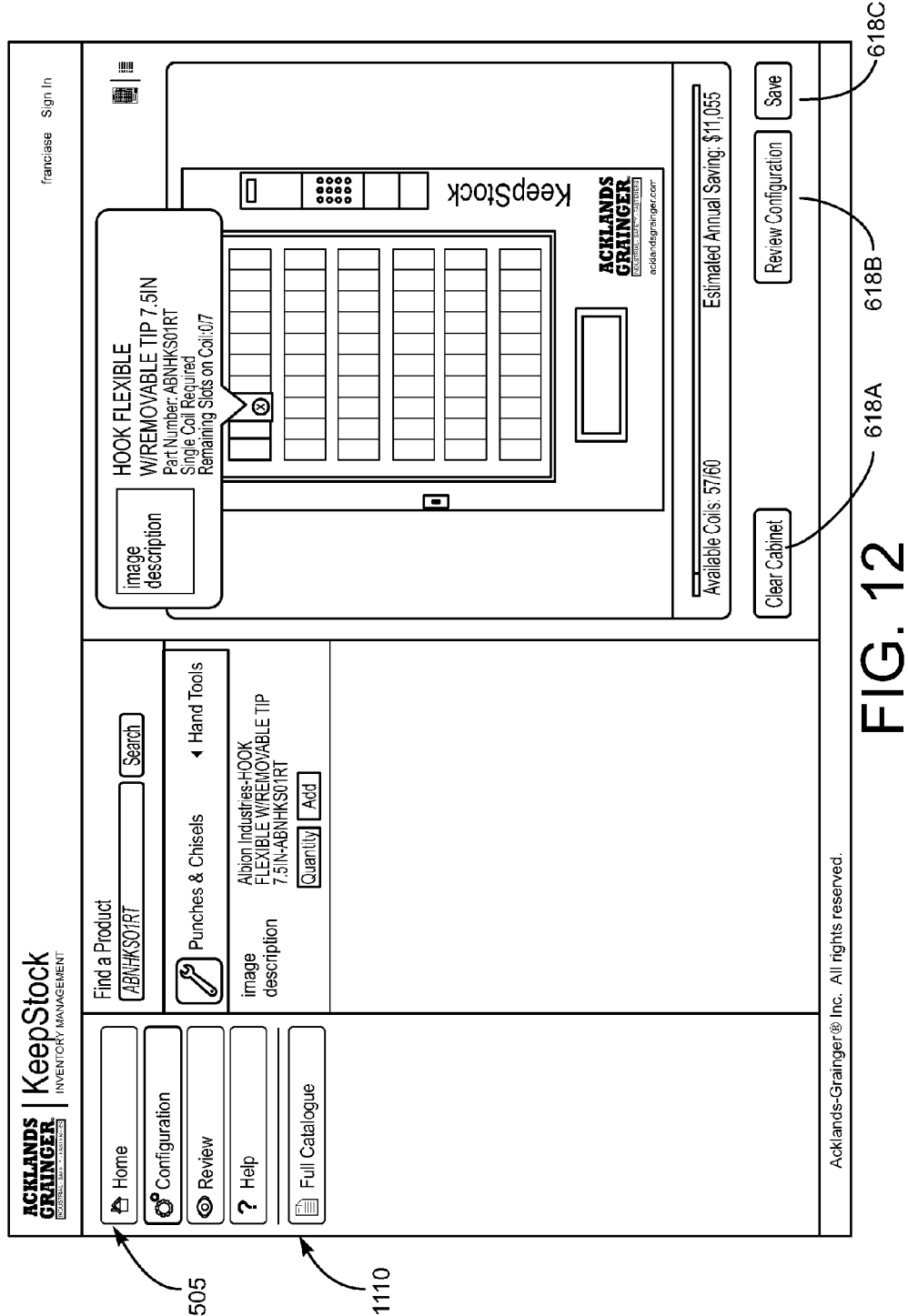
FIG. 12 illustrates an example webpage showing a specific product lookup.

As previously noted, the navigation bar 505 may provide navigational shortcuts for use with the system 300. For example, as illustrated in FIGS. 11 and 12, in the example navigation bar 505, a selectable button 1110 may link the user to a full catalogue. When selected, the button 1110 may present the user with an interface 1100 that may be a website linked and displayed in an Internet browser, and/or a customized interface, displaying a product catalogue, such as in this instance, a tool catalogue at the provider's publically and/or privately available website.

Upon browsing the full catalog, the user can select a part number from the catalogue and input and/or otherwise copy and paste the number into the product search portion of the interface 610. Alternatively, the full catalogue may include a link to directly provide the product information to the interface 610. Upon entering the product number, the system 300 will search for the corresponding part, display the appropriate details, and allow the user to add the product to the cabinet as previously described. For instance, in the illustrated example, the user has entered a part number, for example "ABNHKS01RT" and the system 300 has updated the interface 610 with the found product information. The user then added three coils worth of the product to the cabinet, which is reflected in the graphical representation of the current cabinet configuration 611. Additionally, by "hovering" over the coil, the product addition details are visible.

Figure 13:
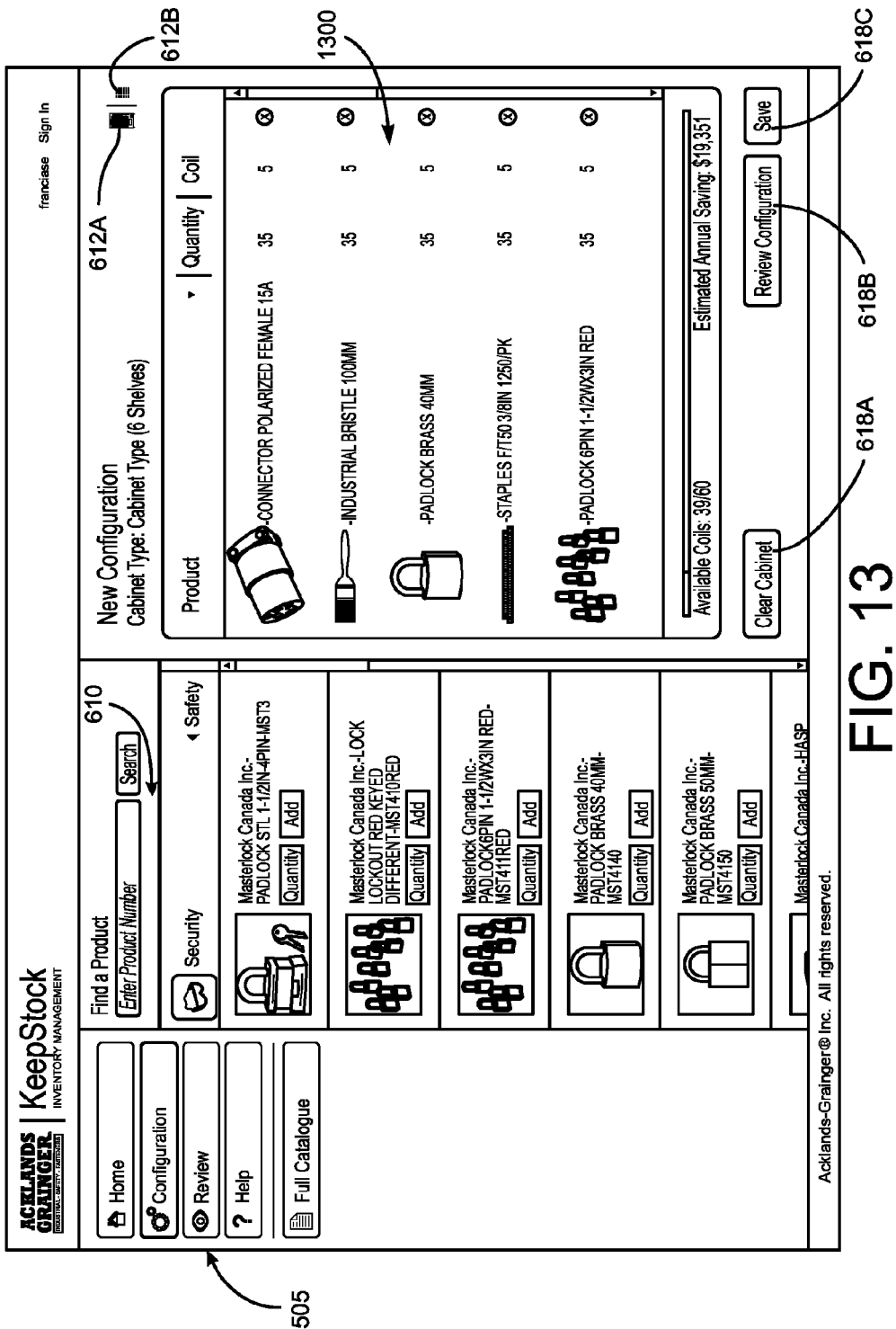
FIG. 13 illustrates an example webpage showing a list view of an example configuration created with the example configuration system.

Turning now to FIG. 13, another example of displaying the current configuration is shown. In particular, in this example, the graphical representation of the current cabinet configuration 611 is selectively replaced by a traditional list view of the contents of the cabinet. Specifically, the interface 612 may be presented with a toggle button having a configuration selection 612A and a list selection 612B. By choosing the list selection 612B, a list view 1300 is provided to the user. The list view may provide any relevant desired information, including for example, the product description, the quantity in the current configuration, the total number of coils occupied by the product, and/or the ability to delete the product from the configuration.

Figure 14:
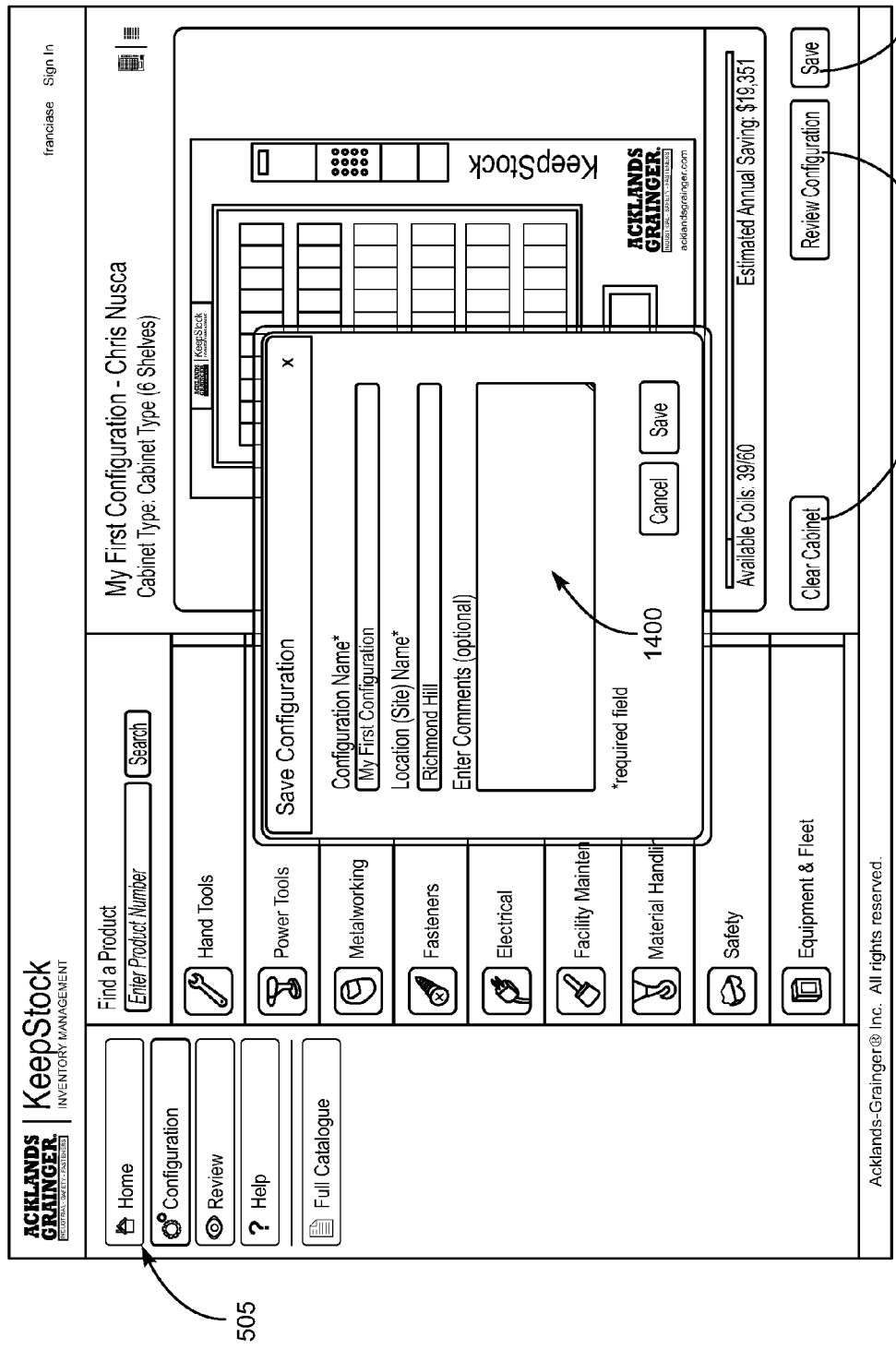
FIG. 14 illustrates an example save window for use with the example configuration system.

Upon making changes to the current configuration, the user may select the "Save" button 618C which may bring up a dialog interface 1400 as illustrated in FIG. 14. The save dialog interface 1400 may request any suitable information including for example, the configuration name, the location, and any comments regarding the configuration. In at least one example, the information in the interface 1400 may be pre-filled based upon the information previously provided by the user and associated with the cabinet configuration.

Figure 15:
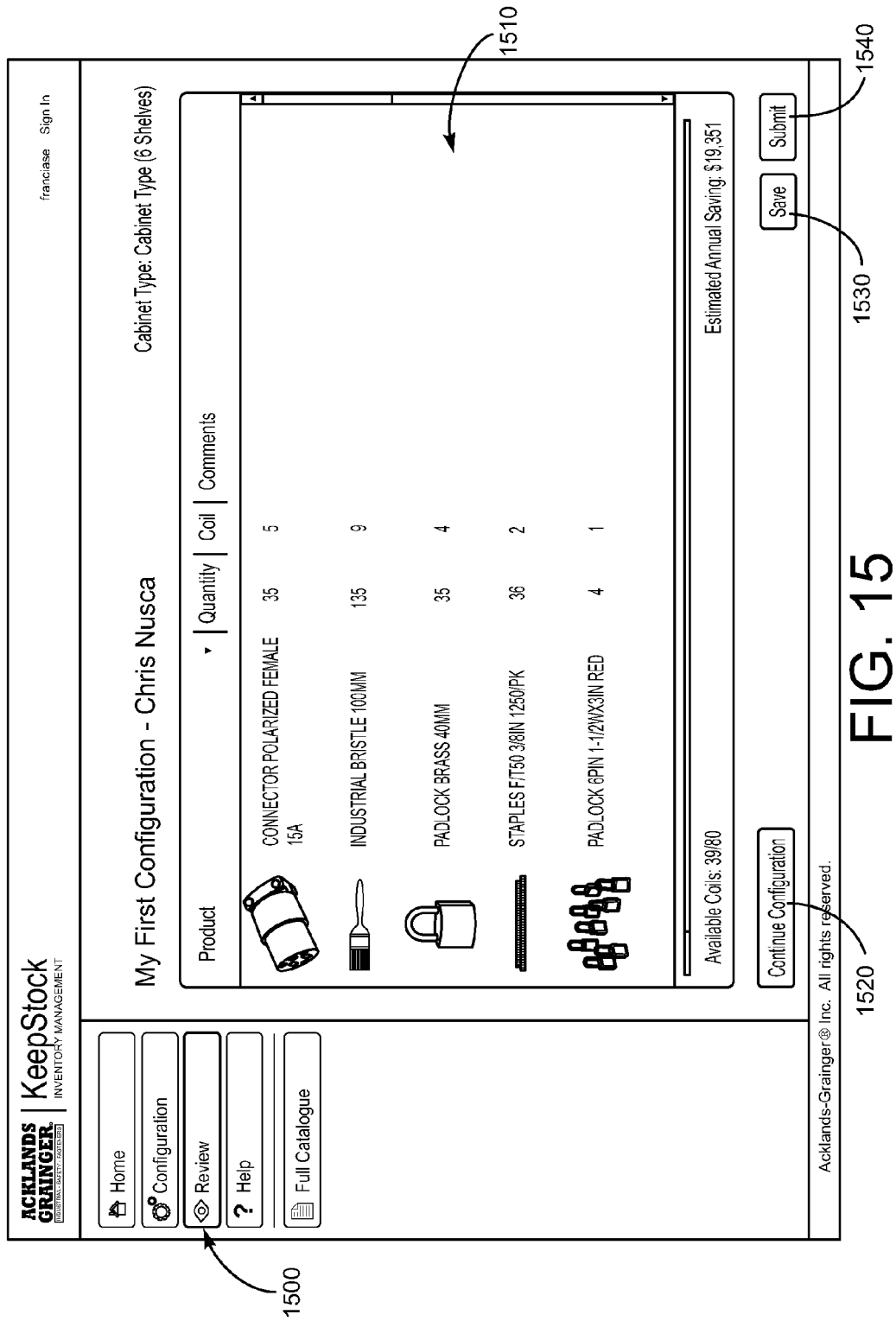
FIG. 15 illustrates an example review window for use with the example configuration system.

Still further, the navigation bar 505 may also provide a navigational shortcut for a "review" of the current configuration. For example, as illustrated in FIG. 15, in the example navigation bar 505, a selectable button 1500 may link the user to a final review of the current configuration. In this instance, when the user selects the button 1500, a "checkout" process may be initiated. In this case, a listing of the contents of the cabinet are presented to the user in an interface 1510. In this read-only interface 1510, the user may browse and/or otherwise review the current configuration for completeness. If the user is not satisfied with the current build, the user may select a cancel button 1520 to return to the configuration page 600 and continue to modify the cabinet. Alternatively, the user may select a save button 1530 to save the configuration as previously described. Finally, if the user is satisfied with the current build, the user can chose the submit button 1540 which will proceed with the final checkout of the build as illustrated in FIG. 16.

Figure 16:
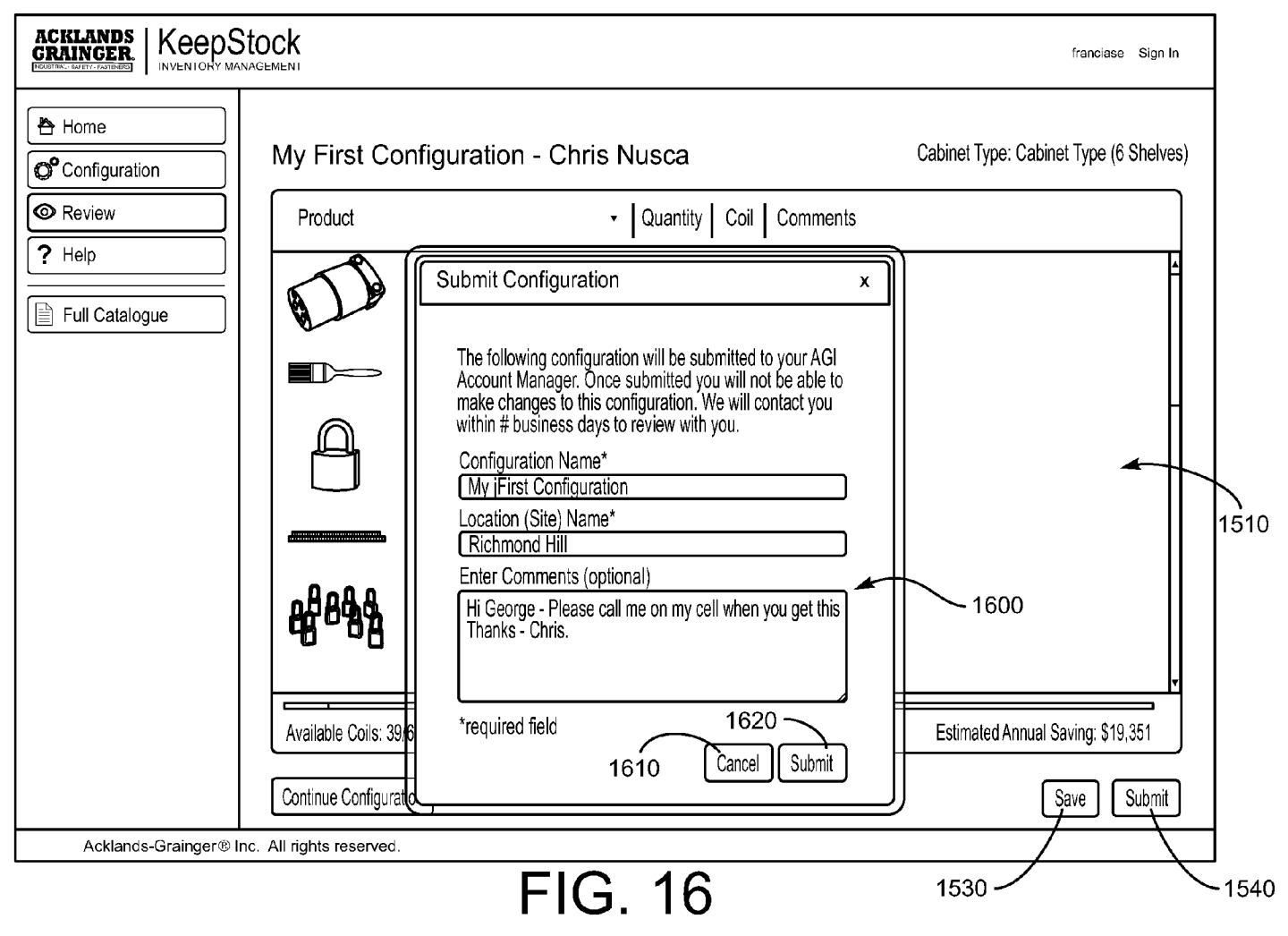

Specially, as illustrated in FIG. 16, upon selection of the submit button 1540, the system 300 presents the user with a final submit interface 1600. In this example interface 1600, the user is asked to provide the final configuration details (e.g., name, location, comments, etc) and allow the user one final chance to make changes by canceling the submit process (e.g., cancel button 1610) or to submit the configuration (e.g., submit button 1620). Once submitted, the user will receive a confirmation message and will be brought back to the home page 500 for additional configuration builds. Behind the scenes, the system 300 will generate the appropriate electronic records for use by the build team to create the configured design.

It will be appreciated that administrators and/or users with different security configurations may be presented with different, less, or additional pages and selections in the navigation bar 505. For example, and administrator may be authorized to add additional users to the system 300, edit current user information, review and/or edit saved configurations, archive builds, etc.

Figure 17:
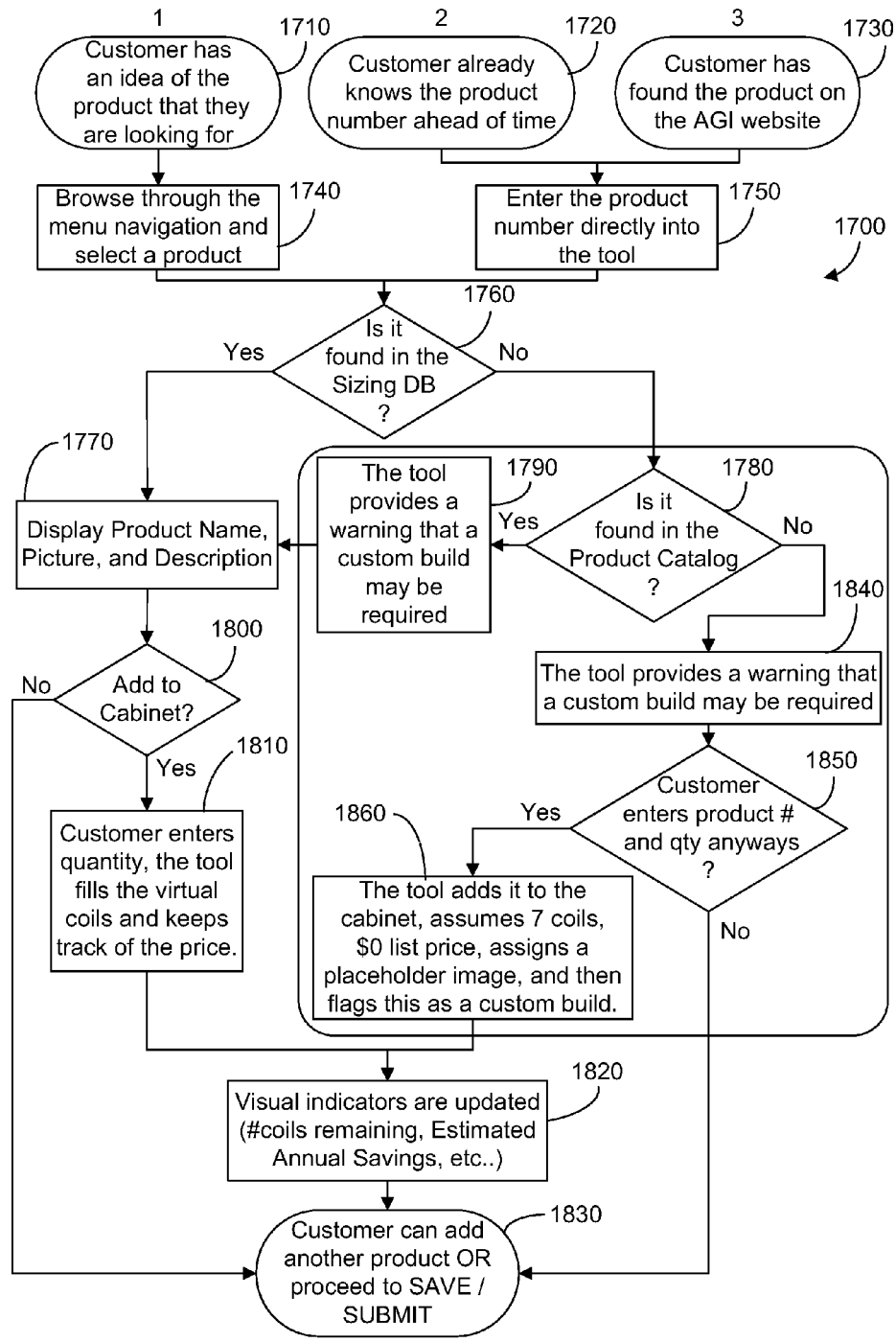
FIG. 17 illustrates in flowchart form and example process for adding products to an example dispensing machine utilizing the example configuration system.

Turning to FIG. 17, there is illustrated a flow chart of one example process 1700 for adding a product to a cabinet, which may be implemented by the example system 300. In the illustrate example, the process 1700 begins with a user selecting a product to add to the configuration. In this instance, the user may have an idea of the product they wish to add, but may not know the details of the product (block 1710), may already know the product number (block 1720), or may have found the product number through, for example, the full catalog and/or other means (block 1730) as previously described. In the instance where the user has an idea of the product that they are looking for (block 1710), the process 1700 allows the user to browse through the interface 610 to find and select a product at block 1740. Otherwise, the user is able to enter the product number directly into the interface 610 at block 1750.

Once the product is selected, at block 1760, the system 300 will look-up the product information in a data repository such as the data repository 68A to determine whether there is sufficient information regarding the product to place the product in the cabinet. In particular, in one instance, the system 300 will determine whether sizing information is readily available for the selected product, which will allow the system 300 to assign the product to the appropriate position in the cabinet as will be described. If the product information, such as the sizing information, is found in the data repository, the system 300, and in this example the interface 710 displays the product name, picture, description, etc. at block 1770. Alternatively, if the sizing information is not found, the process 1700 will search the full product catalog at block 1780. If the product is found in the full product catalog, the process will continue at block 1790 where a warning message may be displayed informing the user that sizing information is not available and that a custom build may be required before continuing on at block 1770.

Continuing on in the instance that the desired product is identified and displayed to the user, the process 1700 then determines whether the product should be added to the cabinet at block 1800. Specifically, if the user chooses to add the product to the cabinet, the user may enter the quantity in, for example, the interface 710 at block 1810. In this example, the process 1700 may visually "fill" the coils, and keep track of the price. As previously described, the visual indicators are updated, such as, for example, the number of coils remaining 616A, the estimated annual savings 616B, the progress bar 616C, etc. at block 1820. Still further, if the amount, size, and/or other reason prevents the process 1700 from adding the product to the build configuration, a warning may be displayed to the user allowing them to delete the product, update the quantity of the product, and/or continue with the product anyway possibly necessitating a custom cabinet. Once the product is added to the build, or if the customer decided not to add the product at block 1800, the process 1700 continues by allowing the customer to add another product and/or proceed to submit and/or save the build as desired at block 1830.

Returning to the block 1780, if the process is unable to identify the desired product in the full product catalog, the process continues at block 1840 where a warning may be displayed to the user indicating that the product is not identified, and that a custom build may be required depending upon the product characteristics, and the available cabinet space. In this example, the user may decide at block 1850 to continue with the unknown product anyway, or may alternatively decide to not add the unknown product and continue on with processing at block 1830 by selecting another product. If the user decides to continue to add the product anyway, at block 1860, the process 1700 will add the product to the cabinet as a place-holder, will assume the entire assigned cabinet space (e.g., the full coil) is occupied, and will further assume a zero annual savings so as to not skew any estimated savings numbers. The process 1700 will then provide a comment associated with the configuration (e.g., a "flag") that will indicate to the actual cabinet processor that the cabinet will require further investigation, such as a possible custom build. Once added, processing will continue at block 1820 as previously described.

Once a customer has completed and submitted a configuration using the system 300, an order will be placed with the contractor associated with the physical build of the cabinet. In this instance, the cabinet information will be stored in the data repository 68A such as in the form of a database, spreadsheet, etc. Each submitted build may be flagged and/or otherwise identified as a "standard" or a "custom" build. For instance, as noted above, if any product is added that does not include sizing information, and/or recognized product information, or if more inventory has been added to the build than can be physically housed in the cabinet, the build may be identified as a custom build requiring further processing by the cabinet manufacturer. Otherwise, the build may be categorized as a standard build and processed under normal operating functions.

It will be further appreciated that the system 300 may provide additional enhancements and/or features as desired. For example, in at least one instance, the system 300 may provide a user with product suggestions based upon the user's previous/current usage, upsell opportunities, similar builds for other customers, new product releases/enhancements, budgetary considerations, etc. Similarly, the system 300 may provide inventory control enhancements through estimations of product usage and/or through actual usage tracking as is know in the art. The system 300 may then proactively suggest inventory modifications and/or configuration modifications based upon the product usage.

In yet another example, the cabinet, once installed, may be provided with a remote connection to a network, such as, for example, the network 12. Additionally, the cabinet may be provided with any suitable inventory tracking device and/or system, including for instance a sensor-based inventory control to track inventory levels, usage levels, etc. in the cabinet during use. In this instance, the cabinet may then provide real-time, near real-time, and/or batch updated inventory data to the host server 68, and the system 300 may utilize the provided inventory data to display a graphical representation of the provided inventory/usage of the cabinet, such as for example, on a virtual cabinet similar to the cabinet 611. Accordingly, in an example of the system 300, a user may access the system 300 as detailed above, and may be presented with an option to view the current status of any cabinet configuration to which they have authorization to view. The cabinet inventory/usage level may be utilized in any appropriate manner including ordering of additional inventory, reconfiguration of the cabinet, program evaluation, updating of the estimation algorithm, etc.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. A non-transient, computer-readable media having stored thereon instructions for customizing inventory in a dispensing cabinet with products within an electronic catalog hosted by a wholesaler system, the instructions performing steps comprising:
    providing for display on a client computing device a user interface in which a graphical representation of a dispensing cabinet for dispensing products is presented, the dispensing cabinet being a point-of-use dispenser including a housing securing a plurality of dispensing mechanisms and a delivery controller for controlling the delivery of the products, the graphical representation of the dispensing cabinet including a graphical representation of each of the plurality of dispensing mechanisms;
    providing a data repository having stored therein information regarding the products including an identifier, and at least one characteristic of the product, and information regarding the characteristics of each dispensing mechanism;
    causing a user interface element to be presented within the user interface, the user interface element providing an access point to the product information stored in the data repository, and allowing selection of at least one product from a listing of products retrieved from the product information stored in the data repository to be added to the dispensing cabinet;
    using at least one characteristic of the at least one product to be added to the dispensing cabinet, at least one characteristic of each product previously added to the dispensing cabinet, and at least one predetermined rule to automatically associate the at least one product to be added to the dispensing cabinet to a corresponding one or more of the plurality of dispensing mechanisms and to re-associate each product previously added to the dispensing cabinet to a corresponding one or more of the plurality of dispensing mechanisms; and
    causing a change in the graphical representation of the dispensing cabinet such that the at least one product to be added to the dispensing cabinet and each product previously added to the dispensing cabinet is visually identified as being associated with the corresponding one or more of the plurality of dispensing mechanisms.

2. A computer-readable media as recited in claim 1, wherein each of the plurality of dispensing mechanisms is at least one of a coil, door, and carousel.

3. A computer-readable media as recited in claim 1, further comprising using a physical characteristics of each of the plurality of dispensing mechanisms to automatically associate the at least one product to be added to the dispensing cabinet to a corresponding one or more of the plurality of dispensing mechanisms and to re-associate each product previously added to the dispensing cabinet to a corresponding one or more of the plurality of dispensing mechanisms.

4. A computer-readable media as recited in claim 1, wherein the at least one characteristic of the at least one product to be added to the dispensing cabinet and the at least one characteristic of each product previously added to the dispensing cabinet used to automatically associate the at least one product to be added to the dispensing cabinet to a corresponding one or more of the plurality of dispensing mechanisms and to re-associate each product previously added to the dispensing cabinet to a corresponding one or more of the plurality of dispensing mechanisms comprises a weight.

5. A computer-readable media as recited in claim 1, further comprising causing a second user interface element to be presented within the user interface, the second user interface element providing information regarding a number of the plurality of dispensing mechanisms not having a product associated therewith.

6. A computer-readable media as recited in claim 5, wherein the information regarding the number of the plurality of dispensing mechanisms not having a product associated therewith includes a progress bar.

7. The computer-readable media as recited in claim 1, wherein the client computing device is at least one of an appliance, a personal computer, a tablet computer, a mobile device, or an ereader.

8. The computer-readable media as recited in claim 1, wherein the at least one characteristic of the at least one product to be added to the dispensing cabinet and the at least one characteristic of each product previously added to the dispensing cabinet used to automatically associate the at least one product to be added to the dispensing cabinet to a corresponding one or more of the plurality of dispensing mechanisms and to re-associate each product previously added to the dispensing cabinet to a corresponding one or more of the plurality of dispensing mechanisms comprises a product genre.

9. The computer-readable media as recited in claim 1, wherein the at least one characteristic of the at least one product to be added to the dispensing cabinet and the at least one characteristic of each product previously added to the dispensing cabinet used to automatically associate the at least one product to be added to the dispensing cabinet to a corresponding one or more of the plurality of dispensing mechanisms and to re-associate each product previously added to the dispensing cabinet to a corresponding one or more of the plurality of dispensing mechanisms comprises a product usage history.

* * * * *